United States Patent
Collins et al.

(10) Patent No.: US 7,136,882 B2
(45) Date of Patent: Nov. 14, 2006

(54) STORAGE DEVICE MANAGER

(75) Inventors: Kevin Collins, Fort Collins, CO (US); Bradley Allen Bowlin, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 508 days.

(21) Appl. No.: 09/919,090

(22) Filed: Jul. 31, 2001

(65) Prior Publication Data

US 2003/0065873 A1    Apr. 3, 2003

(51) Int. Cl.
*G06F 17/00* (2006.01)

(52) U.S. Cl. .......................... 707/204; 707/7; 707/205

(58) Field of Classification Search ............ 707/1–3, 707/8, 10, 100–102, 200, 202–205, 7; 710/1, 710/22, 23; 711/100, 101, 111, 112, 154, 711/159–162, 165
See application file for complete search history.

(56) References Cited

U.S. PATENT DOCUMENTS

| | | | | |
|---|---|---|---|---|
| 5,018,060 A | * | 5/1991 | Gelb et al. | 707/205 |
| 5,487,164 A | * | 1/1996 | Kirchhofer et al. | 707/7 |
| 5,802,357 A | * | 9/1998 | Li et al. | 707/2 |
| 5,862,325 A | * | 1/1999 | Reed et al. | 709/201 |
| 6,070,159 A | * | 5/2000 | Wilson et al. | 707/3 |
| 6,144,961 A | * | 11/2000 | de la Salle | 707/10 |
| 6,173,291 B1 | * | 1/2001 | Jenevein | 707/200 |
| 6,301,590 B1 | * | 10/2001 | Siow et al. | 715/500 |
| 6,647,415 B1 | * | 11/2003 | Olarig et al. | 709/224 |
| 6,684,229 B1 | * | 1/2004 | Luong et al. | 707/204 |

OTHER PUBLICATIONS

Kris Jamsa, "1001 Window 98 Tips", copyright 1998 by Gulf Publishing Company, Tips 1-3, 120, 121, 134, 188-190, 908-911.*
"About WebDAV"; Copyright Microsoft Corporation; http://www.microsoft.com/WINDOWS200/en/professional/iis/htm/core/wcwdcp.htm; Published to the Internet at least as early as May 11, 2001; 2 pages.
"HTTP/WebDAV Access"; Copyright Microsoft Corporation; http://msdn.microsoft.com/library/psdk/exchsv2k/ exch2k http webdav access.htm; Published to the Internet at least as early as May 11, 2001; 1 page.

\* cited by examiner

*Primary Examiner*—Tim Vo
*Assistant Examiner*—Hung Pham (57) ABSTRACT

An apparatus and method for managing data on a storage device. In one embodiment, the apparatus is embodied in computer readable program code and comprises a management interface. The apparatus and method may identify and categorize data on the storage device. In one embodiment, the data is checked against one or more thresholds on a programmed and periodic basis. When one or more of the thresholds are satisfied, the user is alerted, and at least a portion of the data may be reallocated based on the category thereof.

3 Claims, 5 Drawing Sheets

STORAGE DEVICE MANAGER

FIELD OF THE INVENTION

The invention generally pertains to storage devices, and more specifically, to managing data on storage devices.

BACKGROUND OF THE INVENTION

Large capacity storage devices (e.g., hard disk drives, compact discs (CDs), ZIP drives, etc.) are now commonly available. In addition, storage devices are continually being developed with even larger capacity, while at the same time, storage devices are becoming physically smaller, faster, and more reliable. However, these storage devices are also being used to store increasingly more data. For example, typical software applications may each consume several hundred megabytes on a user's computer. Also for example, video and music are increasingly available in digital format, with each file consuming significant storage capacity on the user's computer. As another example, more sophisticated Internet "web" pages with extensive graphics may be downloaded, at least temporarily, to the user's computer. In any event, a portion or all of this data may be stored on one or more of the storage devices on the user's computer for later use. However, as the volume of stored data increases, the performance of the storage device may decline. Eventually, the storage device may even reach capacity.

Various functions that allow the user to delete temporary and/or cache files from the storage device are available with some software applications and operating systems (e.g., Microsoft INTERNET EXPLORER® for Microsoft WINDOWS® 98®, Microsoft Corporation, Redmond Wash.). However, the user is typically not given any options for managing the data. Instead, these functions typically only delete the files in a particular directory (e.g., /temp, /cache). In addition, the user may not select particular files to delete, and instead must delete all of the files in the directory. For example, the user may delete all of the files stored in the /temp directory. Often, the user is not even able to review these files before these files are deleted. Furthermore, these functions only remove limited data from the storage device. Therefore, even when the user makes regular use of these functions, the storage device may continue to fill to capacity.

One solution for ensuring available storage capacity is to purchase and install additional storage devices. For example, most computers are equipped to accommodate multiple hard disk drives, floppy diskette drives, CD drives, ZIP drives, etc. Or another solution may be to supplement attached storage devices with network storage. For example, the user may have access to an Internet storage device, the hard disk drive of a server or other workstations on the network, dedicated network storage (e.g., a network attached storage (NAS) device, a storage area network (SAN)), etc. However, there may be costs or fees associated with the use of this type of storage, and the capacity of network storage may also be limited. In addition, at least a portion of the data on the storage device is typically no longer needed, or at least it may not be needed on a programmed and periodic basis. Therefore, continuing to store this data, whether on an attached storage device or on storage devices available over a network, decreases performance of the storage device, and reduces the storage capacity available for others to use (e.g., on a network storage device).

Another solution is to manually review at least a portion of the data on the storage device using a directory manager, such as Microsoft WINDOWS® Explorer, or the like. Data that is no longer needed, or not needed on a programmed and periodic basis, may be deleted or archived (e.g., using tape backups, or the like) as the user sees fit. However, this is a time consuming process. As such, the user generally will only make random, cursory reviews of the data on the storage device, if any.

SUMMARY OF THE INVENTION

The inventors have devised apparatus and methods for managing data on a storage device. The apparatus is preferably embodied in computer readable storage media containing computer readable program code. The apparatus may comprise program code for identifying data on the storage device, and program code for categorizing the data identified on the storage device. For example, the categories may be defined based on a file type associated with the data. The apparatus may also comprise program code for reallocating at least a portion of the data based on a category thereof. For example, the program code for reallocating at least a portion of the data may comprise program code for performing at least one of the following functions: removing the data from the storage device, moving the data, compressing the data, and archiving the data. Or for example, the program code for reallocating at least a portion of the data may comprise program code for moving the data to an Internet storage device. The apparatus may also comprise an interface, program code for displaying information for the data to a user via the interface, and program code for receiving commands from the user via the interface. For example, the categorized data may be displayed, and the user may select the data to be reallocated via the interface. The apparatus may also comprise a database defining at least one threshold, and program code for reading the database associated with the program code for reallocating, wherein the data is reallocated when the at least one threshold is satisfied.

A method for managing data on a storage device is also disclosed. The method may comprise the steps of: identifying data on the storage device, categorizing the identified data, and reallocating at least a portion of the data based on a category thereof. Optionally, at least a portion of the categorized data may be selected, wherein the selected data is reallocated.

BRIEF DESCRIPTION OF THE DRAWINGS

Illustrative and presently preferred embodiments of the invention are illustrated in the drawings, in which.

DESCRIPTION OF THE PREFERRED EMBODIMENT

Although other embodiments are presented herein, and yet other embodiments are contemplated as being within the scope of the invention, a preferred embodiment may be described as follows. When the user starts the PC (e.g., 100) and once the operating system is loaded, a software application (e.g., a management application) is loaded for managing data on the hard disk drive (e.g., 110) attached to the user's PC (e.g., 100). Preferably, the management application operates in the background, although a discreet icon or toolbar may also be displayed for the user. Preferably a list is generated and maintained to identify the data stored on the hard disk drive (e.g., 110). The list may be updated periodically, or each time data changes on the hard disk drive (e.g., 110). The identified data is then categorized, using a file association table, based on the application that was used to generate the data.

Although the user may otherwise make use of, or configure, the software application (e.g., by clicking on the icon or toolbar using a PC mouse), preferably, the management application operates in the background until a threshold is met. For example, when the available storage capacity of the hard disk drive (e.g., 110) reaches 80% of the total capacity, the user is warned that the storage capacity has declined. Preferably, a management interface (e.g., 400 in FIG. 4) is displayed for the user, allowing the user to view the various categories (e.g., 420) of data and to reallocate the data to make more storage capacity available on the hard disk drive (e.g., 110).

Figure 4:
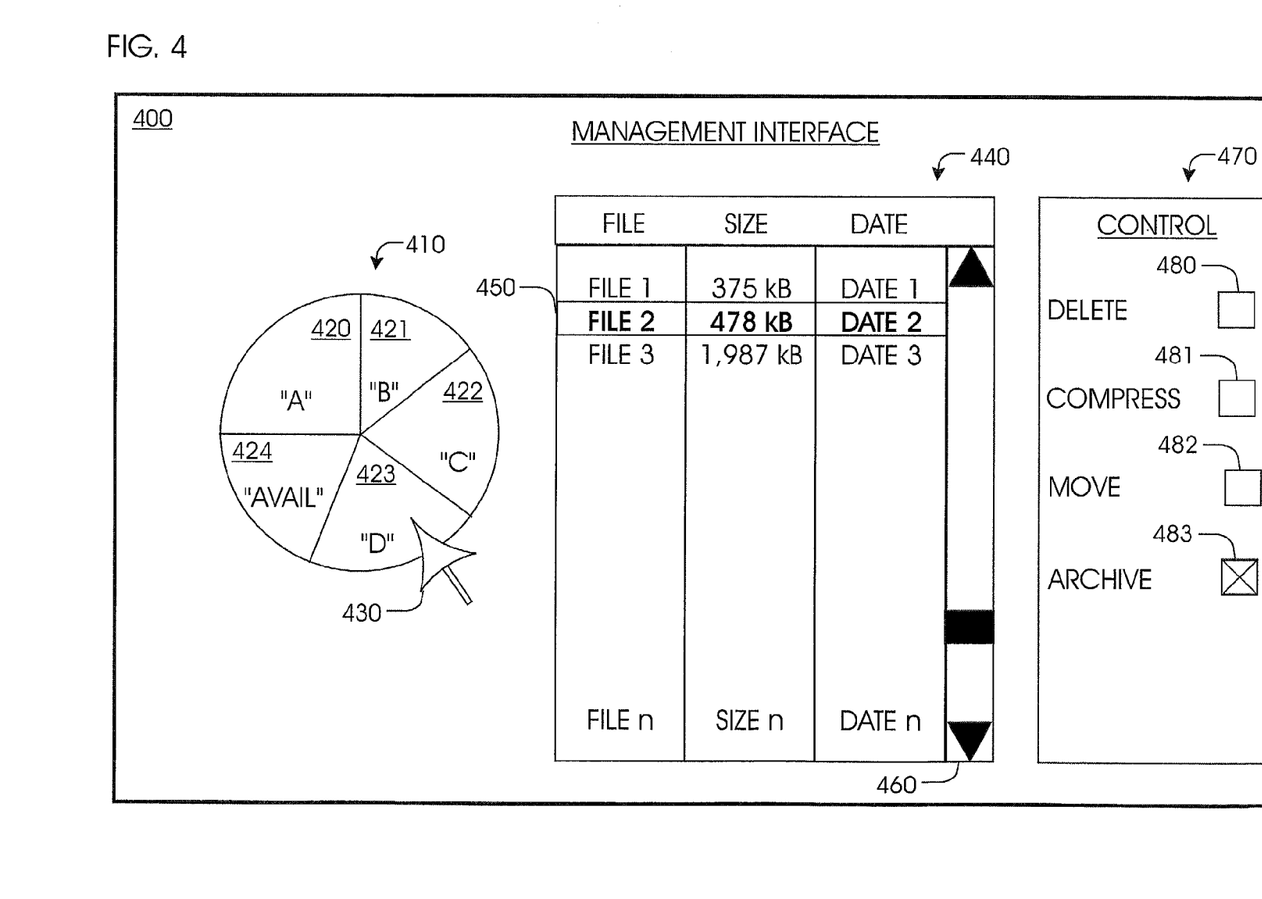
FIG. 4 is an exemplary management interface.

The user may use the management interface (e.g., 400) to "drill down" and thus learn more about the various categories of data. For example, the user may view individual files in a particular category (e.g., 420) by making the appropriate selection with the management interface (e.g., 400). In addition, the user may use the management interface (e.g., 400) to readily reallocate the data (e.g., archive it to an Internet storage device 130), thus making more capacity available on the hard disk drive (e.g., 110).

The various embodiments of the invention allow the user to readily manage a portion of or all of the data on the storage device 110, 130 in a user-friendly, easy-to-use environment. Having generally described apparatus and methods for managing data on a storage device 110, 130, and several advantages thereof, several embodiments of the invention will now be described in further detail.

Figure 1:
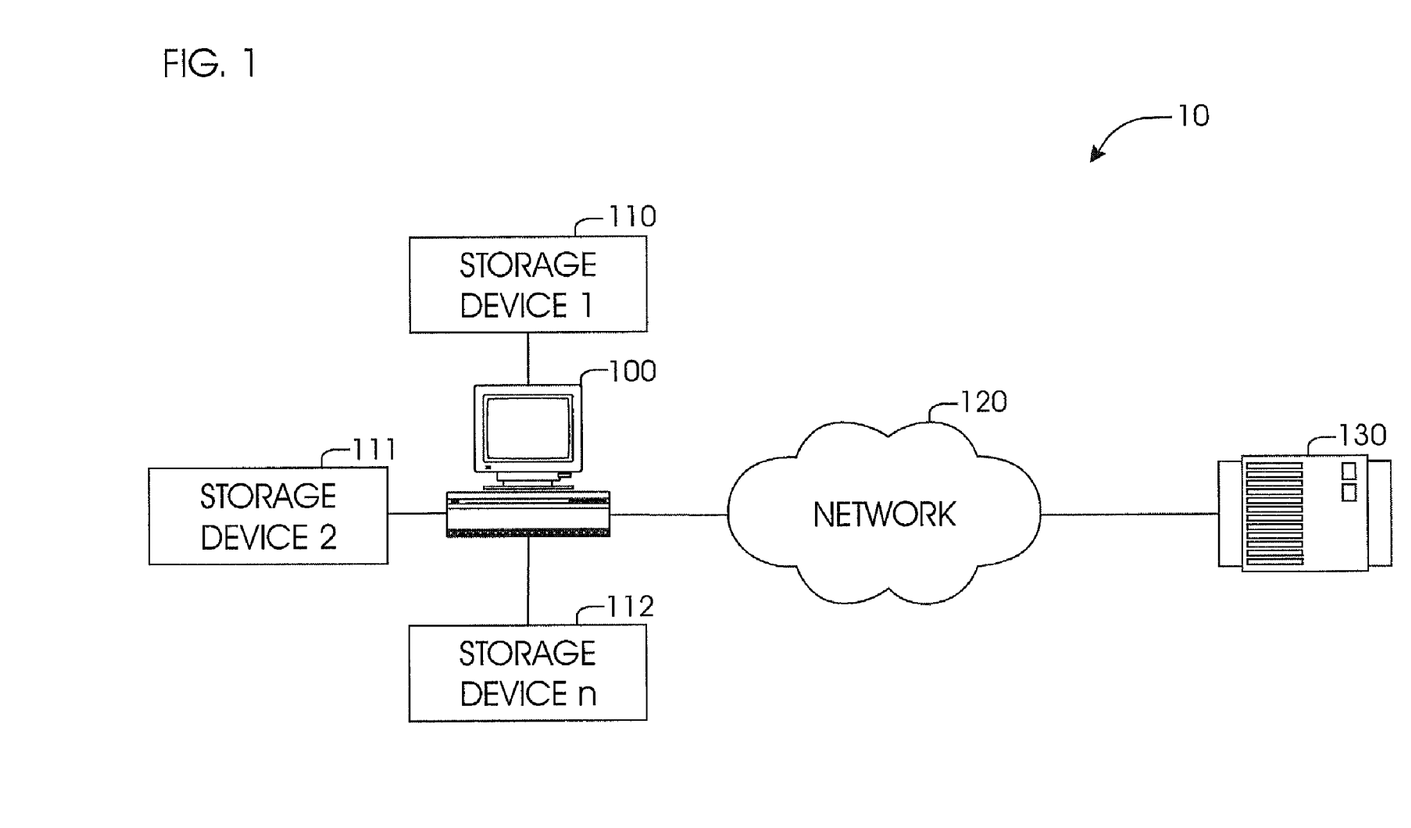
FIG. 1 is a high-level diagram of an embodiment of apparatus for managing a storage device.

FIG. 1 is a high-level diagram of an embodiment of an apparatus 10 for managing a storage device, such as attached storage devices 110–112, and/or network storage device 130, for a host 100. For example, a host 100 may have one or more hard disk drives 110–112, and may be linked over the Internet 120 to one or more Internet storage devices 130. Over time and with use, the storage devices may be used to store increasing volumes of data, such as software applications, digital video data, digital music data, Internet "web" page downloads, etc. As the volume of data on one or more of the storage devices 110–112, 130 (hereinafter, generally referred to as 110, 130) increases, the performance of the storage device 110, 130 may decline, and eventually, the storage device 110, 130 may even reach capacity. According to the teachings of the invention, however, the user may manage the data stored thereon to enhance the performance of the storage device 110, 130 and/or reduce the likelihood that the storage device 110, 130 will reach capacity.

It is understood that the term "data" is used herein to refer generally to information in electronic format stored on the storage device 110, 130. Examples of data may comprise one or more files, one or more directories, a combination of files and directories, binary machine-readable information, text or ASCII information, program code, etc. In addition, the data 210 may be in any suitable format, standard or otherwise (e.g., proprietary, compressed, encrypted, etc.).

Preferably, the host 100 is a personal computer (PC), such as a desktop or laptop PC. However, the host 100 may be any suitable computer having at least one storage device 110, 130 associated therewith. For example, the host 100 may be a personal digital assistant (PDA), a network workstation, administrator terminal, network server, etc. It is further understood that the host 100 may be linked over the network 120 via any suitable means (e.g., modem, T-1, digital subscriber line (DSL), infrared, etc.), and may be linked through yet other devices (e.g., routers, hubs), other networks (e.g., LAN, Intranet), etc. Likewise, the host 100 need not be permanently connected to the storage device 110, 130, and may only link thereto on an occasional basis.

It is understood that the term "storage device" is used herein to indicate the functional aspects thereof. Preferably, one or more storage devices 110–112 are directly attached to the host 100, such as one or more hard disk drives. Alternatively, or in addition to, one or more storage devices 130 (e.g., an Internet storage device) may be linked to the host 100 via the network 120. In any of these embodiments, the storage devices 110, 130 may be any fixed or removable storage media. For example, the storage device 110, 130 may be one or more hard disk drives, zip disks, compact discs (CDs), magnetic tape, just a bunch of disks (JBOD), etc.

The invention is preferably embodied in computer readable program code (e.g., firmware and/or software) executable by suitable processing hardware/software (e.g., host 100). It is understood that the program code may comprise one or more routines and/or subroutines. Likewise, the program code may be embodied in any suitable format. For example, the program code may be a stand-alone application, a plug-in module for an existing software application and/or operating system (OS), the program code may be integrated into an application or OS, etc.

The computer readable program code is preferably stored on computer readable storage media. It is understood that any suitable storage media may be used, including but not limited to, one or more hard disk drives, CDs, read only memory (ROM), random access memory (RAM), one or more network storage devices (e.g., network area storage (NAS) devices, a storage area network (SAN)), etc. Indeed, the computer readable program code may be stored on one or more of the attached storage devices 110–112. It is also understood that the program code may reside at one or more locations on the network 120. For example, the program code may be stored on one or more of the storage devices 130 accessible via the network 120.

According to various embodiments of the invention, the data may be identified on one or more of the storage devices 110, 130, and categorized. For example, the data may be identified by one or more attributes thereof (e.g., by file name, file extension, etc.), and categorized based on one or more attributes thereof (e.g., by file size). At least a portion of the identified data may be reallocated based at least in part on the category thereof. Examples of reallocating at least a portion of the data may comprise removing it from the storage device 110, 130, moving or transferring it from one location to another (e.g., from storage device 111 to another storage device 112, 130), compressing it, archiving it, etc., or a combination thereof.

Preferably, the data on the storage device 110, 130 is monitored (i.e., the data is identified and categorized) checked against the thresholds for the various categories on a programmed and periodic basis. When one or more thresholds are satisfied, the user is alerted (e.g., via an audio signal or a graphic), so that the user may manage the data on the storage device 110, 130. Preferably, a management interface 400 is provided for ready management of the data (e.g., with only a few "clicks" of the PC mouse).

Figure 2:
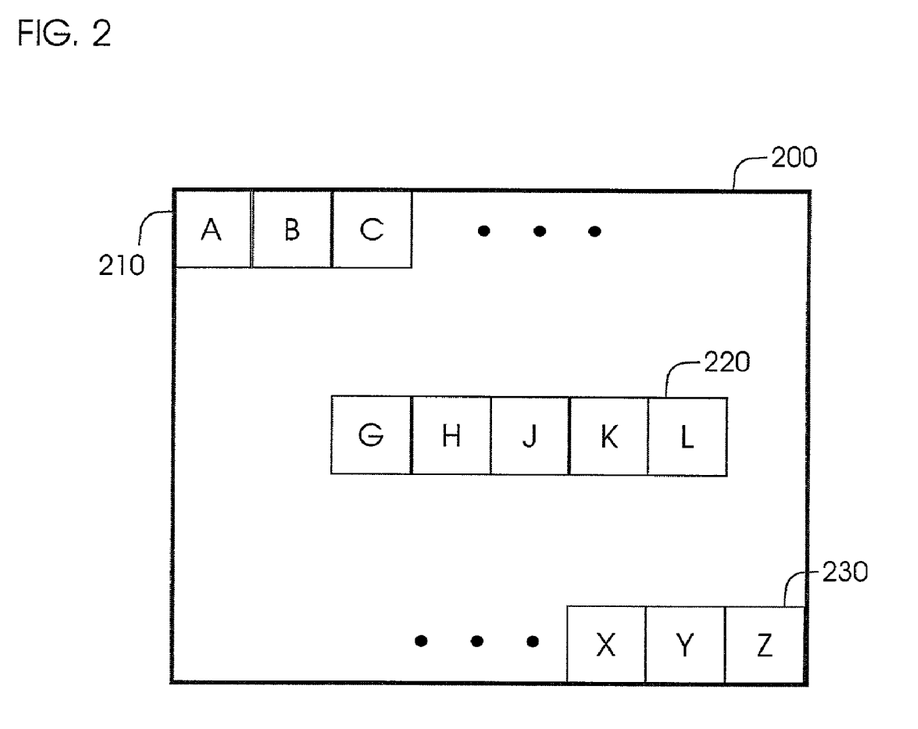
FIG. 2 is a high-level diagram illustrating data on a portion of a storage device.

FIG. 2 is a high-level diagram illustrating data on a portion 200 of a storage device 110, 130. Program code may be provided for inventorying the storage device 110, 130 or a portion 200 thereof to identify the data stored thereon. The data in FIG. 2 is generally referred to as 210, 220, and 230. The data 210, 220, 230 stored on the storage device 110, 130, may be identified based on one or more attribute(s) thereof (e.g., file name, file extension, etc.). The identified data is preferably categorized based on the data itself, as illustrated below.

In a preferred embodiment, the data may be identified by generating and maintaining a list of the data on the storage device 110, 130. For example, the data may be initially identified by attribute and stored in a list (e.g., an ASCII or text file, suitable database, etc.). The list may be periodically refreshed, for example, at startup, on timed intervals (e.g., every hour, once a day), etc. Alternately, the storage device may be monitored and the list updated whenever a file is accessed, created, deleted, changed, etc.

The following examples illustrate embodiments for identifying and categorizing data on one or more storage devices 110, 130. In the first example, the data may be identified by one or more attributes thereof. For example, the program code for identifying the data may determine the file name (e.g., "A", "B", etc.) and/or the file extension (e.g., ".jpg", ".bmp", etc.) for the data on the storage device 110, 130. In addition, the data may be categorized based on one or more of the attributes associated with the data, as shown in Table 1.

TABLE 1

| File Name | File Extension | Category |
|---|---|---|
| A | .jpg | Graphics |
| B | .bmp | Graphics |
| C | .doc | Word Processing |
| ... | ... | ... |
| G | .jpg | Graphics |
| H | .bmp | Graphics |
| J | .mp3 | Audio |
| K | .doc | Word Processing |
| L | .mp3 | Audio |
| ... | ... | ... |
| X | .mp3 | Audio |
| Y | .bmp | Graphics |
| Z | .doc | Word Processing |

In Table 1, the file name and the file size for the data is identified, and the data is categorized based on the file extension. For example, data having the file extension ".bmp" or ".jpg" is categorized as "Graphics", data having file extension ".mp3" is categorized as "Audio", and so forth.

It is understood that the example given above with respect to Table 1 is merely illustrative of data on a storage device 110, 130 that may be identified and categorized based on attributes of the data itself. These example is not intended to limit the scope of the invention. In another embodiment, a file association table (e.g., generated and maintained by the operating system (OS)) may be used to categorize the data. For example, the file association table (e.g., File Allocation Table (FAT), Microsoft WINDOWS® NT® File System (NTFS), etc.) may comprise various attributes of the file such as the application to which the data corresponds, the date the file was last accessed, etc. As such, the data may be more narrowly categorized. For example, instead of being more broadly categorized as word processing documents, the data may be categorized as Microsoft WORD® documents and as Corel WORD PERFECT® documents.

It is also understood that in other embodiments, additional or other attributes may be used to identify the data. For example, the identity of the data may be based at least in part on the date that it was generated, changed, accessed, etc. As another example, the identity of the data may be based on the file size, whether the data is compressed, etc. As yet another example, the identity of the data may be based on the data location on the storage device 110, 130 (e.g., the disk sector), the author (e.g., of a word processing document), the application the file was created with, etc.

It is further understood that the categories may be based on any suitable criteria. For example, the categories may be defined based on the needs of the user, the type or volume of data on the storage device 110, 130, etc. The data may be broadly categorized (e.g., as "word processing documents"), or the data may be more narrowly categorized (e.g., as "word processing documents created by User Y"). In addition, categories may be predefined, may be user-defined, may be defined by an administrator, etc. Likewise, the categories may be predefined, and/or may be configured by the user (e.g., based on the changing needs of the user).

Preferably an information database 300 (e.g., illustrated in FIG. 3) is provided for managing the data on the storage device 110, 130. The information database 300 may be one or more relational databases, ASCII files, etc. Suitable program code may be provided for accessing the information database 300 to store and retrieve attributes of the data in the information database 300. Suitable program code may also be provided for identifying and categorizing the data on the storage device 110, 130 using attributes of the data stored in the information database 300.

Figure 3:
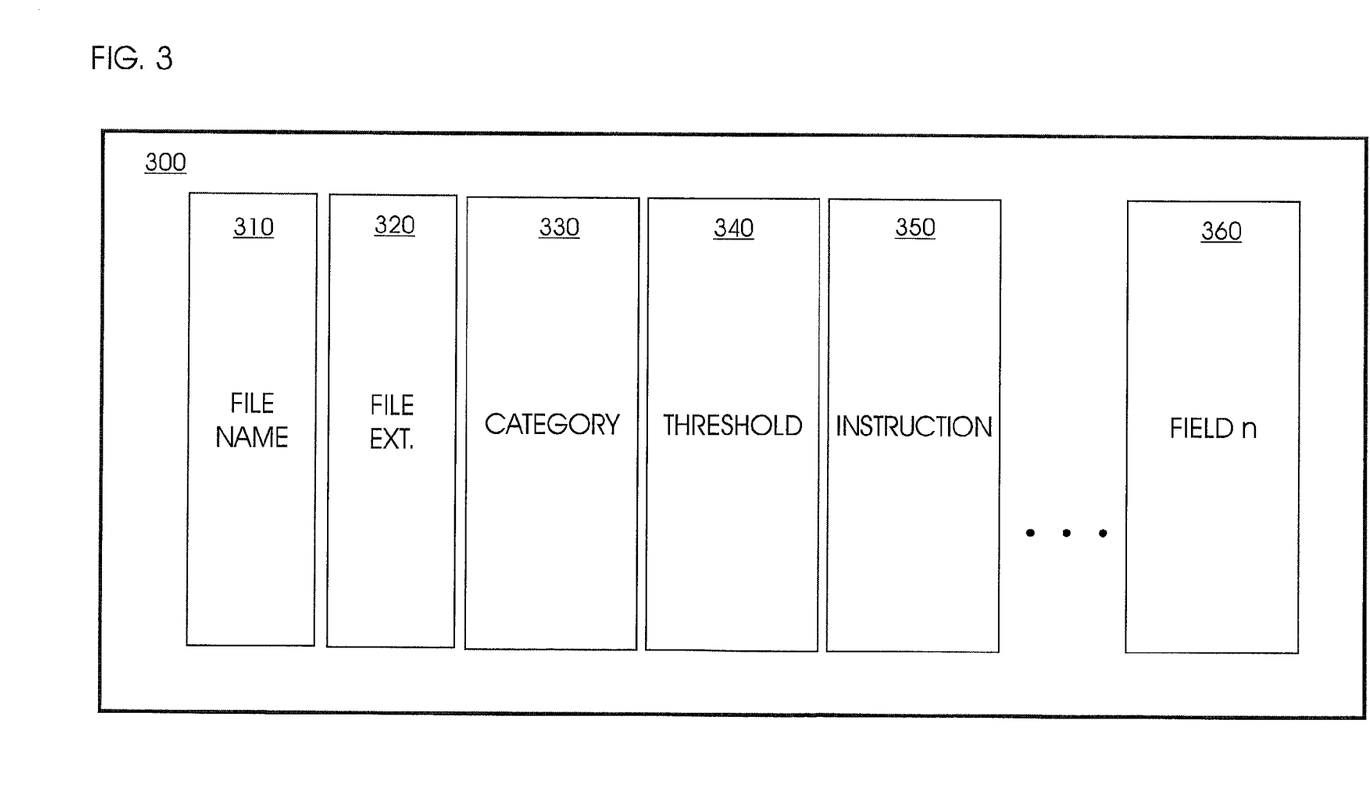
FIG. 3 illustrates a database for managing a storage device according to one embodiment.

The information database 300 preferably comprises one or more fields (e.g., 310–320) that are defined therein for the various attributes of the data on the storage device 110, 130. For example, field 310 and field 320 may be defined in the information database 300 for storing the file name(s) and the file extension(s), respectively, associated with the data on the storage device 110, 130. Alternate, additional, or fewer fields may also be defined in the information database 300 for the various attributes for identifying and categorizing the data on the storage device 110, 130.

The information database 300 preferably also comprises one or more fields (e.g., 330) therein defining the various categories for the data on the storage device 110, 130. For example, the category field 330 may comprise definitions for a graphics category, an audio category, a video category, by date, etc. The following are examples of definitions for several categories:

GRAPHICS: file extension=.bmp, .jpg, . . .
AUDIO: file extension=.mp3, . . .
UNUSED DATA: last access date>12 months.

It is understood that the examples of definitions for the categories given above are merely illustrative and are not intended to limit the scope of the invention thereto. As discussed above, the categories may be defined based on any suitable criteria, and may be more complex than the examples shown above.

The information database 300 preferably also comprises one or more fields (e.g., 340) therein defining thresholds for the various categories of data on the storage device 110, 130. For example, the threshold field 340 may define a volume threshold for one or more categories of data stored on the storage device 110, 130. Or for example, the threshold field 340 may define a volume threshold for the entire storage device 110, 130, or a portion thereof (e.g., a partition). Or for example, the threshold field 340 may define a date that the data stored on the storage device 110, 130 was last accessed. The following are examples of thresholds that may be defined in the category field 330:

DIGITAL IMAGE DATA: 500 MB

DIGITAL MUSIC DATA: 250 MB

PARTITION A: 80% Capacity

DATE: 6 Months

Preferably, the data on the storage device 110, 130 is monitored (i.e., the data is identified and categorized) continuously or on a programmed and periodic basis, and the categorized data is checked against the thresholds for the various categories. When one or more thresholds are satisfied (e.g., met or exceeded), the user is alerted (e.g., via an audio signal or a graphic), so that the user may manage the data on the storage device 110, 130, as illustrated below.

The thresholds are preferably predefined or provided as defaults (e.g., based on typical usage patterns), for immediate and simplified use. However, in other embodiments, the user or system administrator may modify one or more of the thresholds. Accordingly, a user interface (e.g., a toolbar or menu option) may be provided to enable the user to make such modifications to the thresholds. For example, the user may right-click using the PC mouse on a desired category (e.g., 420 in FIG. 4) in the management interface 400 (FIG. 4), to view and edit the threshold associated therewith.

It is understood that the exemplary threshold definitions given above are merely illustrative and are not intended to limit the scope of the invention thereto. The thresholds may be based on any suitable criteria, and may be more complex than the examples shown above. Likewise, the thresholds may be user-defined, static, or dynamic (e.g., changing based on the needs of the user, the currently available storage capacity from various sources, etc.).

The information database 300 preferably also comprises one or more fields (e.g., 350) therein defining instructions based on the various thresholds for categories of data on the storage device 110, 130. For example, the instruction field 350 may define a response to a threshold for one or more categories of data stored on the storage device 110, 130. The following are examples of instructions that may be defined in the instruction field 350:

---

IF Word Processing Data > 100 megabytes;
  THEN Alert User.
IF Digital Image Data > 500 megabytes;
  THEN Compress to 50%.
IF Partition A = 80% capacity;
  THEN Activate Management Interface (e.g., 400).
IF Storage Device (e.g., 110) = 95% capacity;
  THEN Display Graphic (e.g., 410).
IF Data Access Date > 6 months AND Partition A > 80% capacity;
  THEN Alert User.

---

It is understood that the instructions given above are merely illustrative and are not intended to limit the scope of the invention thereto. The instructions may be based on any suitable criteria, and may be more complex than the examples shown above. Likewise, the instructions may be user-defined static, or change dynamically (e.g., based on the needs of the user, the type of data currently stored, etc.).

The information database 300 may be updated, in whole or in part, on any suitable basis. For example, the information database 300 may be dynamically updated (e.g., every time data on the storage device 110, 130 changes), updated only at startup, updated periodically, updated when requested by the user, etc.

It is understood that the information database 300 shown and described with respect to FIG. 3 is merely illustrative of an information database 300, and other embodiments are also contemplated as being within the scope of the invention. For example, the information database 300 is not limited to the fields shown and described, and additional fields (e.g., Field n 360) may also be provided. Alternate or fewer fields than those shown may be provided. Likewise, the fields may be further subdivided, or multiple fields may be combined as a single field (e.g., as a single attributes field, not shown). Or, one or more fields may be related to one another. Fields may also be user-defined (e.g., category fields, instruction fields, etc.). Likewise, the user may add, remove, and/or edit fields, or portions thereof.

Preferably, the data on the storage device 110, 130 is monitored in the background and on a programmed and periodic basis. When a threshold is satisfied, the user is alerted. For example, when the user's digital music data exceeds a threshold of 250 MB, an icon may be displayed alerting the user that this threshold is satisfied. The user may then click on this icon to obtain a more detailed analysis of the data and the threshold. In one embodiment, a toolbar may also be displayed for the user, wherein the user may select from various options, such as displaying the current status of the data on the storage device 110, 130, changing the configuration settings (e.g., selecting one or more storage devices 110, 130 for monitoring, defining thresholds, defining categories), etc.

As an illustration, program code may be provided for displaying the identified data and attributes thereof to a user via a management interface 400 (e.g., illustrated in FIG. 4). The management interface 400 may be a graphical user interface (GUI), such as for use with Microsoft WINDOWS® 98®. Also preferably, program code is provided for receiving commands from the user via the management interface 400 for managing the data on the storage device 110, 130, as illustrated below. Preferably, the management interface 400 allows the user to readily manage the data on the storage device 110, 130 (e.g., with only a few "clicks" of the PC mouse), as illustrated below.

It is understood that the management interface 400 shown in FIG. 4 is merely illustrative of an exemplary interface that may be displayed for the user. Other embodiments are also contemplated as being within the scope of the invention. In one embodiment, an icon or toolbar (not shown) may be displayed on the user's screen (e.g., in a corner thereof). When a threshold is satisfied, the icon may automatically activate and display or sound an alert for the user. For example, a dialog box (not shown) may be displayed on the user's screen notifying or alerting the user of the threshold that has been satisfied, and giving the user the option to take action (e.g., archiving data so as to increase storage capacity), to temporarily ignore the warning, to modify the threshold, etc. Preferably, in such an embodiment, the user is also presented with an explanation of the alert (e.g., that the data in category "A" is exceeding the desired capacity), and a suggested or recommended action (e.g., to archive the data). When the user decides to take action, the management interface 400, or a portion thereof (e.g., the graphic 400, a "Wizard" Interface, etc.), may be displayed for the user to take action, as illustrated below. In another embodiment, the user may manually activate the management interface 400 (e.g., by clicking on the icon) to manage the data on the storage device 110, 130.

The identified and categorized data may be displayed for the user in the management interface 400, for example, as graphic 410. Preferably, the graphic is a pie chart for ease of use and understanding by the user. However, other exemplary graphics 410 may comprise, but are not limited to, any suitable graph, a list, icons, etc. In this illustration, the data has been categorized as follows: Category "A" 420, Category "B" 421, Category "C" 422, Category "D" 423, and an availability category "AVAIL" 424. For example, Category "A" 420 may be "Graphics", Category "B" 421 may be "Audio", and so forth. Preferably, a category (e.g., 424) is also displayed for unused or available storage capacity on the storage device 110, 130. Likewise, data that may not be readily categorized may be categorized as miscellaneous. For example, data having attributes not defined in any of the categories may be categorized by default as miscellaneous data.

It is understood that the categories may be generic labels, such as "A", "B", "C", etc., wherein a key may be displayed for further describing the categories. Alternately, the category label may include sufficient description itself (e.g., "AVAIL"). Likewise, the categories may be specific application labels, such as "Adobe ACROBAT®".

In any event, such presentation provides the user with a readily understood representation of the data on the storage device 110, 130. For example, the user can readily see that a particular category (e.g., category "B" which may be Digital Music Data) consumes a relatively significant portion of the storage device 110, 130. As such, the user may desire a closer look at that particular category of data. Accordingly, the user may "drill down" to view various attributes of the data in that particular category. For example, the user may select a category using a PC mouse by positioning the cursor 430 over the desired category and "clicking" with the PC mouse button.

It is understood that the user may "drill down" in any suitable manner. In an exemplary embodiment, the graphic 410, data table 440, and control panel 470 may be initially displayed in the management interface 400. When the user selects a category (e.g., 421) from the graphic 410, the data table 440 may be "filled", and may be updated based on the actions of the user (e.g., selecting another category such as 423). In another exemplary embodiment, only the graphic 410 may be initially displayed for the user, and the graphic 410 may disappear, or be "grayed out", and be replaced by the data table 440 once a category (e.g., 421) is selected from the graphic 410. In yet another exemplary embodiment, separate "windows" may be displayed as the user "drills down" to examine the data.

Continuing with the illustration, in FIG. 4, the user has selected category "D" 423. In response to making the selection, one or more attributes of the data categorized as "D" is displayed in more detail in table 440. For example, the user may be presented with a data table 440. The data table 440 may comprise attributes, such as, but not limited to, file name, file size, and the date the file was most recently accessed. The user may scroll through the data and view the attributes thereof. For example, the user may operate the scroll bar 460 using the cursor 430 with the PC mouse, or the like. Likewise, the user may change the sort on the table, for example, by file name, by file size, by date modified, etc.

It is understood that any suitable attributes of the data in the selected category (e.g., category "D" 423) may be displayed for the user in the management interface 400. In addition, the attributes may be displayed in any suitable manner, such as in a chart, a table, as icons, etc.

Based on this more detailed analysis of the categorized data, the user may determine that the data in this category should remain as it is on the storage device 110, 130. Alternately, the user may select a portion of or all of the data in the selected category to reallocate. For example, the user may determine that one or more files in category "D" are no longer needed and may be deleted. Or for example, the user may determine that one or more files in category "D" are older files that are only accessed on an infrequent basis, and should therefore be archived. As such, the user selects a portion of, or all of the identified data using the cursor 430 and the PC mouse, or the like. As an example, "File 2" (e.g., selection 450) is shown selected in FIG. 4.

Once a portion of or all of the data is selected, the selected data 450 may be reallocated. Preferably, the user may select one or more functions for reallocating the selected data 450 from among a plurality of functions. In FIG. 4, the user may select one or more functions from the control panel 470. Functions may be provided, such as, a delete function 480, a compress function 481, a transfer or move function 482, and an archive function 483. For example, the delete function 480 may temporarily remove (e.g., by moving it to a "recycle bin") or permanently remove the selected data 450 from the storage device 110, 130. Or for example, the compress function 481 may compress the selected data 450. Or for example, the transfer or move function 482 may transfer or move the selected data 450 to another location on the storage device 110, 130, or to another storage device altogether. Or for example, the archive function 483 may move, or compress and move, the selected data 450 to another location on the storage device 110, 130 itself (e.g., an archive directory), or another storage device altogether (e.g., a CD). It is understood that not all of the functions shown in FIG. 4 need be provided, and that other suitable functions for reallocating the selected data 450 may also be provided.

In FIG. 4, the archive function 483 is shown selected, as indicated by the "X" in the corresponding check box. Program code may be provided for performing the selected function. In one embodiment, the selected function may be performed automatically according to default or preconfigured settings. For example, where the user has selected the archive function 483, as in FIG. 4, the data may be automatically compressed and moved to a default or preconfigured archive location. In another embodiment, an option window (not shown) may be displayed requesting user input. For example, where the user has selected the archive function 483, the option window may request an archive location (e.g., a directory) on the storage device 110, 130, degree of compression desired, etc.

Preferably, the archive function 483 archives the data on storage available from a storage service provider (SSP) (e.g., an Internet storage device 130). A suitable protocol, such as the WebDAV protocol discussed below, may be used to readily and transparently archive the data from the local PC (e.g., host 100) to the remote storage location (e.g., Internet storage device 130). Alternately, a default location may be provided (e.g., during setup), such as a CD or Internet storage device 130, where the data is always archived.

It is understood that the management interface 400 shown in FIG. 4, the components thereof, and the examples given above with respect thereto are merely illustrative and are not intended to limit the scope of the invention thereto. Preferably, at least the management interface 400 is refreshed or updated (e.g., graphic 410, data table 440) to reflect any changes to the data or the categories thereof. For example, where all of the files in one of the categories 420–424 (e.g., Category B) are deleted, the selected category (e.g., 421) is preferably not displayed as part of the refreshed management interface 400. Or for example, where several files are deleted, the proportion shown in the pie chart is preferably updated to show that portion smaller relative to the other portions, and to remove the deleted files from the table 440.

Other embodiments are also contemplated as being within the scope of the invention. In another embodiment, for example, separate "windows" may be displayed for the categories, data attributes, and/or the functions. In another embodiment, the management interface 400 may be displayed initially with only the pie chart 410, and the table 440 and control box 470 may be displayed in the same "window" as the user makes selections, thereby stepping the user through the management process. In another embodiment, for example, the user may right click on a category on the graphic 410 and be presented with the management options (e.g., archive, compress, etc.), without having to select specific files from table 440. In yet other embodiments, dialog boxes may be displayed requesting additional information or verification from the user. For example, where the user has selected the delete function 480, a dialog box may be displayed requesting that the user verify that the selected data is to be deleted. Or for example, where the user has selected the transfer or move function 482, a dialog box may be displayed requesting a destination for the selected files. Or for example, the user may right click a control function (e.g., Archive 483) and change or define the properties associated therewith (e.g., the archive destination). Other embodiments are also contemplated as being within the scope of the invention.

Any suitable protocol may be used for identifying the data or retrieving the attributes thereof. For example, the Web Distributed Authoring and Versioning (WebDAV) protocol (i.e., an extension of the HTTP/1.1 protocol) provides capabilities for remote access and management of data via the Internet. The WebDAV protocol defines methods used to transfer or move, copy, and delete data. In addition, an encoding format (i.e., the Extensible Markup Language (XML)) may be used to transfer the properties or attributes of the data across the network 120.

In addition, any suitable security may also be provided when transmitting the attributes of the data across the Internet. For example, the WebDAV protocol may be integrated with Microsoft WINDOWS® 2000® and IIS 5.0 to offer IIS permissions and discretionary access control lists (DACLs) in the NTFS file system.

Figure 5:
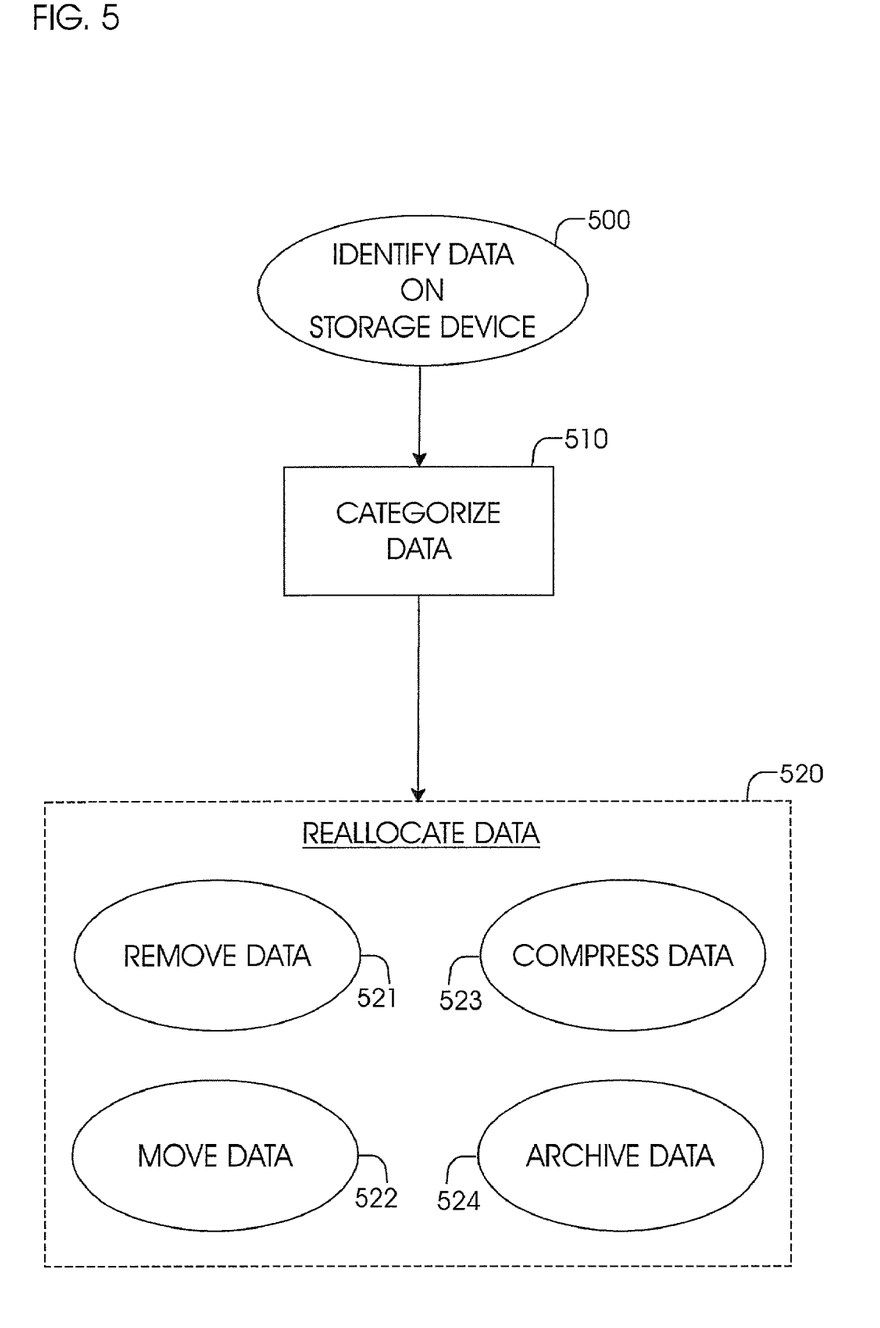
FIG. 5 is a flow diagram illustrating an embodiment of a method for managing a storage device.

FIG. 5 is a flow diagram illustrating an embodiment of a method for managing a storage device 110, 130. In step 500, the data is identified on the storage device 110, 130. For example, the data may be identified by file name and/or file extension, as illustrated above with respect to Table 1. In step 510, the data is categorized based on the data itself (e.g., one or more attributes thereof). For example, the data may be categorized based on the file extension associated with the data, as illustrated above with respect to Table 1. In step 520, at least a portion of the data may be reallocated based on the category thereof. That is, the data may be removed from the storage device 110, 130, as shown in step 521. Alternately, the data may be transferred or moved to another storage device, as shown in step 522. For example, the data may be transferred or moved to a second hard disk drive that is attached to the host 100, to a CD or ZIP disk. Or for example, the data may be transferred or moved to an Internet storage device 130. Alternately, the data may be compressed (e.g., using a suitable compression utility), as shown in step 523. Alternately, the data may be archived, as shown in step 524.

It is understood that the exemplary steps shown in FIG. 5 and discussed above in reference thereto are merely given to be illustrative of a method of the invention, and are not intended to limit the scope of the invention thereto. In another embodiment of the method, the data may be reallocated in step 520 by both compressing 523 the data and moving 522 the data. In another embodiment of the method, at least a portion of the categorized data may be selected (e.g., selection 450 illustrated in FIG. 4) for reallocating in step 520. In another embodiment, at least one threshold may be defined, wherein the data is reallocated based on the threshold. That is, the threshold may be defined (e.g., as a volume of data), wherein the data may be reallocated (or the user notified to reallocate the data) when the data on the storage device 110, 130 meets or exceeds the threshold defined therefor. In another embodiment, a number of categories may be defined for the data before the data is categorized according thereto. For example, the user may define categories, or the categories may be predefined. In addition, the step of reallocating the data, in step 520, may be automatic (i.e., without user input based on preconfigured or predefined parameters). Yet other embodiments are also contemplated as being within the scope of the invention.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. An apparatus for managing storage space, comprising:
a processor;
a storage device communicatively connected to the processor;
a memory module comprising logic instructions recorded in a computer-readable medium which, when executed by a processor, configure the processor to:
perform an action when an amount of available storage capacity on the storage device falls below a threshold, and to:
present, in a user interface, an indicia of an amount of data storage consumed by a plurality of categories of data files and one or more reallocation operations applicable to the plurality of categories of data files;
receive, from the user interface, a capacity threshold, a reallocation operation from the one or more reallocation operations presented and a category of data files from the plurality of categories of data files presented to which the reallocation operation is applicable; and
apply the received reallocation operation to the received category of data files when the received category of data files consumes an amount of storage exceeding the received capacity threshold,
wherein the memory module futher comprises logic instructions which, when executed by the processor, configure the processor to:
sort data files on the storage device into the plurality of categories of data files based on at least one characteristic of the data files; and
reallocate a portion of the data in the received category of data files when a storage capacity consumed by the received category of data files exceeds the storage capacity threshold.

2. The apparatus of claim 1, wherein the memory module further comprises logic instructions which, when executed by a processor, configure the processor to:

monitor a storage capacity consumed by a category of data files from the plurality of categories of data files.

3. The apparatus of claim 1, wherein the memory module further comprises logic instructions which, when executed by a processor, configure the processor to perform the reallocation operation selected from a group of operations consisting of deleting a file, compressing a file, moving a file, and archiving a file.

* * * * *

UNITED STATES PATENT AND TRADEMARK OFFICE
CERTIFICATE OF CORRECTION

| | |
|---|---|
| PATENT NO. | : 7,136,882 B2 |
| APPLICATION NO. | : 09/919090 |
| DATED | : November 14, 2006 |
| INVENTOR(S) | : Kevin Collins et al. |

It is certified that error appears in the above-identified patent and that said Letters Patent is hereby corrected as shown below:

In column 12, line 58, in Claim 1, delete "futher" and insert -- further --, therefor.

In column 12, line 66, in Claim 1, delete "storage" and insert -- received --, therefor.

Signed and Sealed this

Sixteenth Day of March, 2010

David J. Kappos
*Director of the United States Patent and Trademark Office*